(12) United States Patent
Ge et al.

(10) Patent No.: US 10,082,404 B1
(45) Date of Patent: Sep. 25, 2018

(54) ELECTRONIC SELF CALIBRATION DESIGN FOR DISK RESONATOR GYROSCOPES USING ELECTRODE TIME MULTIPLEXING

(71) Applicant: THE BOEING COMPANY, Chicago, IL (US)

(72) Inventors: Howard H. Ge, Chicago, IL (US); Yong Liu, Chicago, IL (US)

(73) Assignee: The Boeing Company, Chicago, IL (US)

( * ) Notice: Subject to any disclaimer, the term of this patent is extended or adjusted under 35 U.S.C. 154(b) by 535 days.

(21) Appl. No.: 14/527,524

(22) Filed: Oct. 29, 2014

Related U.S. Application Data

(63) Continuation of application No. 14/500,601, filed on Sep. 29, 2014, now abandoned.

(51) Int. Cl.
*G01C 25/00* (2006.01)

(52) U.S. Cl.
CPC .................... *G01C 25/005* (2013.01)

(58) Field of Classification Search
CPC .............................. G01C 25/005; G01C 19/00
USPC ........................................................ 73/1.37
See application file for complete search history.

(56) References Cited

U.S. PATENT DOCUMENTS

| | | | |
|---|---|---|---|
| 4,655,081 A * | 4/1987 | Burdess ............... | G01C 19/567 310/329 |
| 6,915,215 B2 * | 7/2005 | M'Closkey ........... | G01C 19/56 702/32 |
| 7,040,163 B2 | 5/2006 | Shcheglov et al. | |
| 7,168,318 B2 | 1/2007 | Challoner et al. | |
| 7,347,095 B2 | 5/2008 | Shcheglov et al. | |
| 7,401,397 B2 | 7/2008 | Shcheglov et al. | |
| 9,329,042 B1 * | 5/2016 | Cazzaniga ......... | G01C 19/5776 |
| 2006/0037417 A1 * | 2/2006 | Shcheglov .......... | G01C 19/5684 74/5.4 |
| 2007/0119258 A1 * | 5/2007 | Yee ..................... | G01C 19/5684 73/649 |

(Continued)

OTHER PUBLICATIONS

Chinwuba D. Ezekwe, et al., "A Mode-Matching Delta Sigma Closed-Loop Vibratory-Gyroscope Readout Interface with a 0.004 degrees/s/squareroot Hz Noise Floor over a 50 Hz Band", 2008 IEEE International Solid-State Circuits Conference (ISSCC), Feb. 6, 2008.

*Primary Examiner* — Natalie Huls
*Assistant Examiner* — Monica S Young
(74) *Attorney, Agent, or Firm* — Haynes and Boone, LLP

(57) ABSTRACT

Systems, methods, and apparatus for a disk resonator gyroscope are disclosed. In one or more embodiments, the disclosed method involves sensing, by at least one first axis sensor/driver electrode associated with a first axis of a resonator, motion associated with the resonator. The method further involves driving at least one first axis sensor/driver electrode with a first axis actuation signal produced by first axis drive circuitry associated with the first axis of the resonator. Also, the method involves sensing, by at least one second axis sensor/driver electrode associated with a second axis of the resonator, the motion associated with the resonator. Further, the method involves driving at least one second axis sensor/driver electrode with a second axis actuation signal produced by second axis drive circuitry associated with the second axis of the resonator.

20 Claims, 5 Drawing Sheets

(56) References Cited

U.S. PATENT DOCUMENTS

| | | | |
|---|---|---|---|
| 2009/0301194 A1* | 12/2009 | Challoner | G01C 19/5684 73/504.12 |
| 2010/0024546 A1* | 2/2010 | Challoner | G01C 19/5684 73/504.08 |
| 2010/0024560 A1* | 2/2010 | Shcheglov | G01C 19/5684 73/649 |
| 2010/0063763 A1* | 3/2010 | Rozelle | G01C 19/5691 702/92 |
| 2010/0251817 A1* | 10/2010 | Ge | B81B 7/0058 73/504.12 |
| 2010/0251818 A1* | 10/2010 | Ge | G01C 19/5684 73/504.12 |
| 2010/0300201 A1* | 12/2010 | Ge | B81B 7/0048 73/504.12 |
| 2013/0055811 A1* | 3/2013 | Kim | G01C 19/5776 73/504.12 |
| 2013/0098153 A1* | 4/2013 | Trusov | G01C 19/5719 73/504.16 |
| 2013/0179105 A1 | 7/2013 | Liu et al. | |
| 2016/0245653 A1* | 8/2016 | Park | G01C 19/5684 |

* cited by examiner

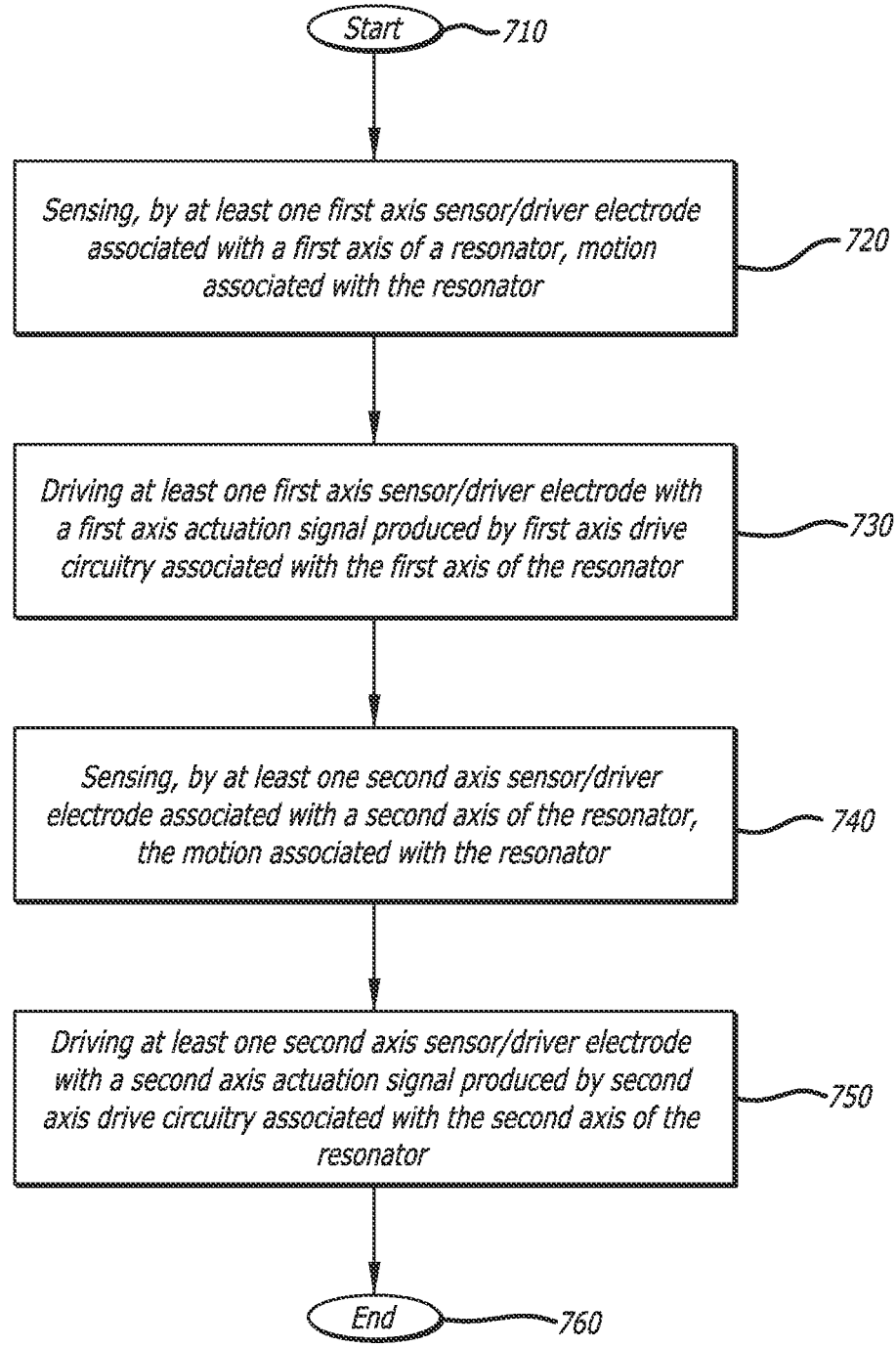

ELECTRONIC SELF CALIBRATION DESIGN FOR DISK RESONATOR GYROSCOPES USING ELECTRODE TIME MULTIPLEXING

CROSS-REFERENCE TO RELATED APPLICATION

This application is a Continuation application of, and claims priority to and the benefit of, U.S. patent application Ser. No. 14/500,601, filed Sep. 29, 2014, the entire disclosure of which is expressly incorporated by reference herein.

GOVERNMENT LICENSE RIGHTS

This disclosure was made with Government support under Contract Number N00178-10-C-1023 awarded by the U.S. Navy. The U.S. Government has certain rights in this invention.

FIELD

The present disclosure relates to disk resonator gyroscopes. In particular, it relates to an electronic self calibration design for disk resonator gyroscopes using electrode time multiplexing.

BACKGROUND

Mechanical gyroscopes are used to determine the direction of a moving platform based upon the sensed inertial reaction of an internally moving proof mass. The bias error in a gyroscope (i.e. a gyro) is typically time varying and cannot readily be calibrated out. The bias error stability over temperature and time sets the limit of the performance of a gyroscope. Currently, temperature regulation and compensation are used to calibrate out the bias error during the short period of time. However, over the long term, the bias error drifts and, currently, there are no techniques for overcoming the drift.

As such, there is a need for an improved gyroscope design that eliminates the bias error.

SUMMARY

The present disclosure relates to a method, system, and apparatus for an electronic self calibration design for disk resonator gyroscopes using electrode time multiplexing. In one or more embodiments, a method for determining motion with a disk resonator gyroscope involves sensing, by at least one first axis sensor/driver electrode associated with a first axis of a resonator, motion associated with the resonator. The method further involves driving at least one first axis sensor/driver electrode with a first axis actuation signal produced by first axis drive circuitry associated with the first axis of the resonator. Also, the method involves sensing, by at least one second axis sensor/driver electrode associated with a second axis of the resonator, the motion associated with the resonator. Further, the method involves driving at least one second axis sensor/driver electrode with a second axis actuation signal produced by second axis drive circuitry associated with the second axis of the resonator.

In one or more embodiments, the sensing by at least one first axis sensor/driver electrode and the driving of at least one first axis sensor/driver electrode are time multiplexed; and the sensing by at least one second axis sensor/driver electrode and the driving of at least one second axis sensor/driver electrode are time multiplexed, thereby enabling closed-loop operation of the gyroscope.

In at least one embodiment, the method further involves synchronizing, with a synchronous switch, the time multiplexing of the sensing by at least one first axis sensor/driver electrode and the driving of at least one first axis sensor/driver electrode with the time multiplexing of the sensing by at least one second axis sensor/driver electrode and the driving of at least one second axis sensor/driver electrode.

In one or more embodiments, the sensing by at least one first axis sensor/driver electrode and the driving of at least one first axis sensor/driver electrode are time multiplexed by use of a first axis switch associated with the first axis of the resonator.

In at least one embodiment, the sensing by at least one second axis sensor/driver electrode and the driving of at least one second axis sensor/driver electrode are time multiplexed by use of a second axis switch associated with the second axis of the resonator.

In one or more embodiments, the method further involves determining a total output signal by summing the first axis actuation signal produced when the first axis drive circuitry is operating in a force to rebalance (FTR) mode, with the second axis actuation signal produced when the second axis drive circuitry is operating in the FTR mode, where the total output signal is proportional to the motion of the resonator without bias error.

In at least one embodiment, the first axis drive circuitry is operating in a FTR mode when producing the first axis actuation signal, and the second axis drive circuitry is operating in an automatic gain control (AGC) mode when producing the second axis actuation signal.

In one or more embodiments, the first axis drive circuitry is operating in an AGC mode when producing the first axis actuation signal, and the second axis drive circuitry is operating in a FTR mode when producing the second axis actuation signal.

In at least one embodiment, the first axis is an x-axis of the resonator and the second axis is a y-axis of the resonator.

In one or more embodiments, the first axis is a y-axis of the resonator and the second axis is an x-axis of the resonator.

In at least one embodiment, a system for a disk resonator gyroscope involves at least one first axis sensor/driver electrode associated with a first axis of a resonator to sense motion associated with the resonator. The system further involves a first axis drive circuitry associated with the first axis of the resonator to produce a first axis actuation signal to drive at least one first axis sensor/driver electrode. Also, the system involves at least one second axis sensor/driver electrode associated with a second axis of the resonator to sense the motion associated with the resonator. Further, the system involves a second axis drive circuitry associated with the second axis of the resonator to produce a second axis actuation signal to drive at least one second axis sensor/driver electrode.

In one or more embodiments, at least one first axis sensor/driver electrode senses and at least one first axis sensor/driver electrode is driven using time multiplexing; and at least one second axis sensor/driver electrode senses and at least one second axis sensor/driver electrode is driven using time multiplexing, thereby enabling closed-loop operation of the gyroscope.

In at least one embodiment, the system further involves a synchronous switch to synchronize the time multiplexing of the sensing by at least one first axis sensor/driver electrode and the driving of at least one first axis sensor/driver electrode with the time multiplexing of the sensing by at least one second axis sensor/driver electrode and the driving of at least one second axis sensor/driver electrode.

In one or more embodiments, the system further involves a first axis switch associated with the first axis of the resonator for the time multiplexing of the sensing by at least one first axis sensor/driver electrode and the driving of at least one first axis sensor/driver electrode.

In at least one embodiment, the system further involves a second axis switch associated with the second axis of the resonator for the time multiplexing of the sensing by at least one second axis sensor/driver electrode and the driving of at least one second axis sensor/driver electrode.

In one or more embodiments, the system further involves at least one processor to determine a total output signal by summing the first axis actuation signal produced when the first axis drive circuitry is operating in a force to rebalance (FTR) mode, with the second axis actuation signal produced when the second axis drive circuitry is operating in the FTR mode, where the total output signal is proportional to the motion of the resonator without bias error.

In at least one embodiment, the first axis drive circuitry produces the first axis actuation signal when it is operating in a force to rebalance (FTR) mode, and the second axis drive circuitry produces the second axis actuation signal when it is operating in an automatic gain control (AGC) mode.

In one or more embodiments, the first axis drive circuitry produces the first axis actuation signal when it is operating in an automatic gain control (AGC) mode, and the second axis drive circuitry produces the second axis actuation signal when it is operating in a force to rebalance (FTR) mode.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 7 is a flow chart depicting the disclosed method for an electronic self calibration design for disk resonator gyroscopes using electrode time multiplexing, which multiplexes the driving/sensing features by using the same set of electrodes, in accordance with at least one embodiment of the present disclosure.

DESCRIPTION

Figure 1:
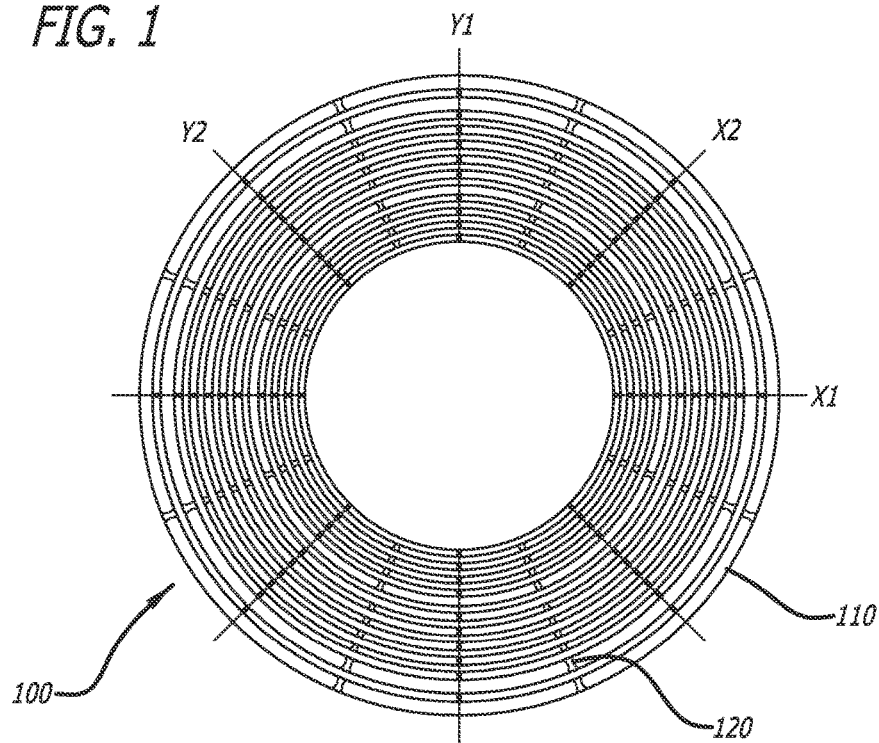
FIG. 1 is a diagram showing disc resonator gyroscope (DRG) modal axes and ring geometries.

The methods and apparatus disclosed herein provide an operative system for an electronic self calibration design for disk resonator gyroscopes using electrode time multiplexing. The disclosed system design, when applied to a disk resonator gyroscope (e.g., a vibratory coriolis sensor or a gyroscope), physically eliminates an important error source in the bias, which is the misalignment between the drive electrodes and the sense electrodes. After this error source is eliminated, an automatic gain control-to-force to rebalance (i.e. AGC-to-FTR) mode reversal is used to estimate the bias error due to damping asymmetry. As a result, the residual bias error can be completely determined over the life of the device without ambiguity and without relying on any external stimulus.

In one or more embodiments, the electrodes of the gyroscope are formed along with the resonator of the gyroscope by etching a wafer selectively bonded to a base plate such that the through-etched sidewalls form the capacitive gaps between the electrodes and the resonator, and the electrodes and the resonator remain separately bonded to the base plate.

As previously mentioned above, mechanical gyroscopes are used to determine the direction of a moving platform based upon the sensed inertial reaction of an internally moving proof mass. A typical electromechanical gyroscope comprises a suspended proof mass, a gyroscope case, pickoffs, sensors, actuators and/or readout electronics. The inertial proof mass is internally suspended from the gyroscope case, which is rigidly mounted to the platform and communicates the inertial motion of the platform while otherwise isolating the proof mass from external disturbances. The pickoffs sense the internal motion of the proof mass, the actuators maintain or adjust this motion, and the readout electronics that must be in close proximity to the proof mass, are internally mounted to the case, which also provides the electrical feed-through connections to the platform electronics and the power supply. The case also provides a standard mechanical interface to attach and to align the gyroscope with the vehicle platform. In various forms, gyroscopes are often employed as a critical sensor for vehicles, such as aircraft and spacecraft. They are generally useful for navigation, or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes, such as laser gyroscopes and fiber optic gyroscopes as well as mechanical vibratory gyroscopes.

Spacecraft generally depends on inertial rate sensing equipment to supplement its attitude control. Currently, this is often obtained by expensive conventional spinning mass gyroscopes (e.g., a Kearfott inertial reference unit) or conventionally-machined vibratory gyroscopes (e.g., a Litton hemispherical resonator gyroscope inertial reference unit). However, both of these types of gyroscopes are very expensive, large, and heavy.

As previously mentioned above, the bias error in a gyroscope (i.e. a gyro) is typically time varying and cannot readily be calibrated out. The bias error stability over temperature and time sets the limit of the performance of a gyroscope. Currently, temperature regulation and compensation are used to calibrate out the bias error during the short term. However, over the long term, the bias error drifts and, currently, there are no techniques for overcoming the drift.

The present disclosure presents a new design of feedback control techniques that, when applied to a disk resonator gyroscope (e.g., a vibratory coriolis sensor or a gyroscope), can physically eliminate errors caused by the drive-to-sense electrodes misalignment. AGC-to-FTR mode reversal techniques are applied to the design to obtain an estimate of the bias error due to damping asymmetry. As a result, the residual bias error can be completely determined without ambiguity over the life of the device.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, which may carry out a variety of functions under the control of one or more microprocessors or other control devices. In addition, those skilled in the art will appreciate that embodiments of the present disclosure may be practiced in conjunction with, and that the system described herein is merely one example embodiment of the present disclosure.

For the sake of brevity, conventional techniques and components related to gyroscopes, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Discussion of Conventional Disc Resonator Gyroscopes (DRGs)

FIG. 1 is a diagram showing disc resonator gyroscope (DRG) modal axes and ring geometries. FIG. 1 shows the modal axes (denoted as X1, Y1 and X2, Y2) and ring geometries of a resonator structure 100, which is formed from resonator rings 110 and spokes 120. In particular, the resonator structure 100 comprises a disc using embedded electrostatic electrodes for excitation and sensing. This type of conventional DRG has been recently developed for microgyro applications. In general, for this type of DRG, the electrodes are formed along with the resonator 100 by etching a wafer that is selectively bonded to a baseplate, such that the through-etched sidewalls form the capacitive gaps between the electrodes and the resonator 100 and the electrodes and the resonator 100 remain separately bonded to the baseplate.

Figure 2:
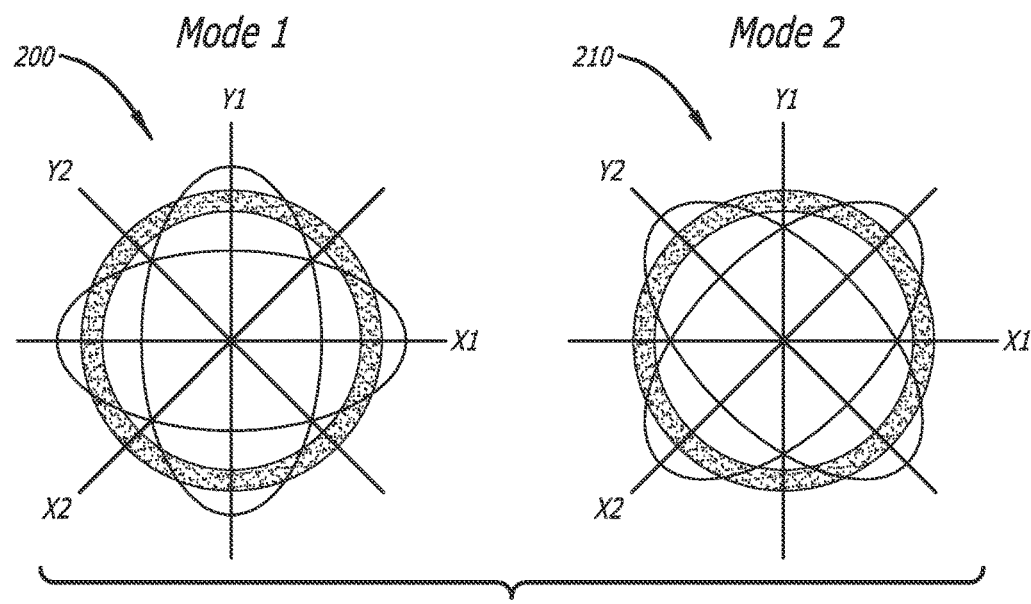
FIG. 2 are graphs showing DRG second order in-plane modes of vibration.

FIG. 2 are graphs 200, 210 showing DRG second order in-plane modes of vibration. The second order in-plane vibration modes of the disc are excited and sensed to measure angular rate. The DRG has two second order in-plane vibration modes (denoted as X1, Y1 and X2, Y2), and are spaced forty-five (45) degrees apart.

Figure 3:
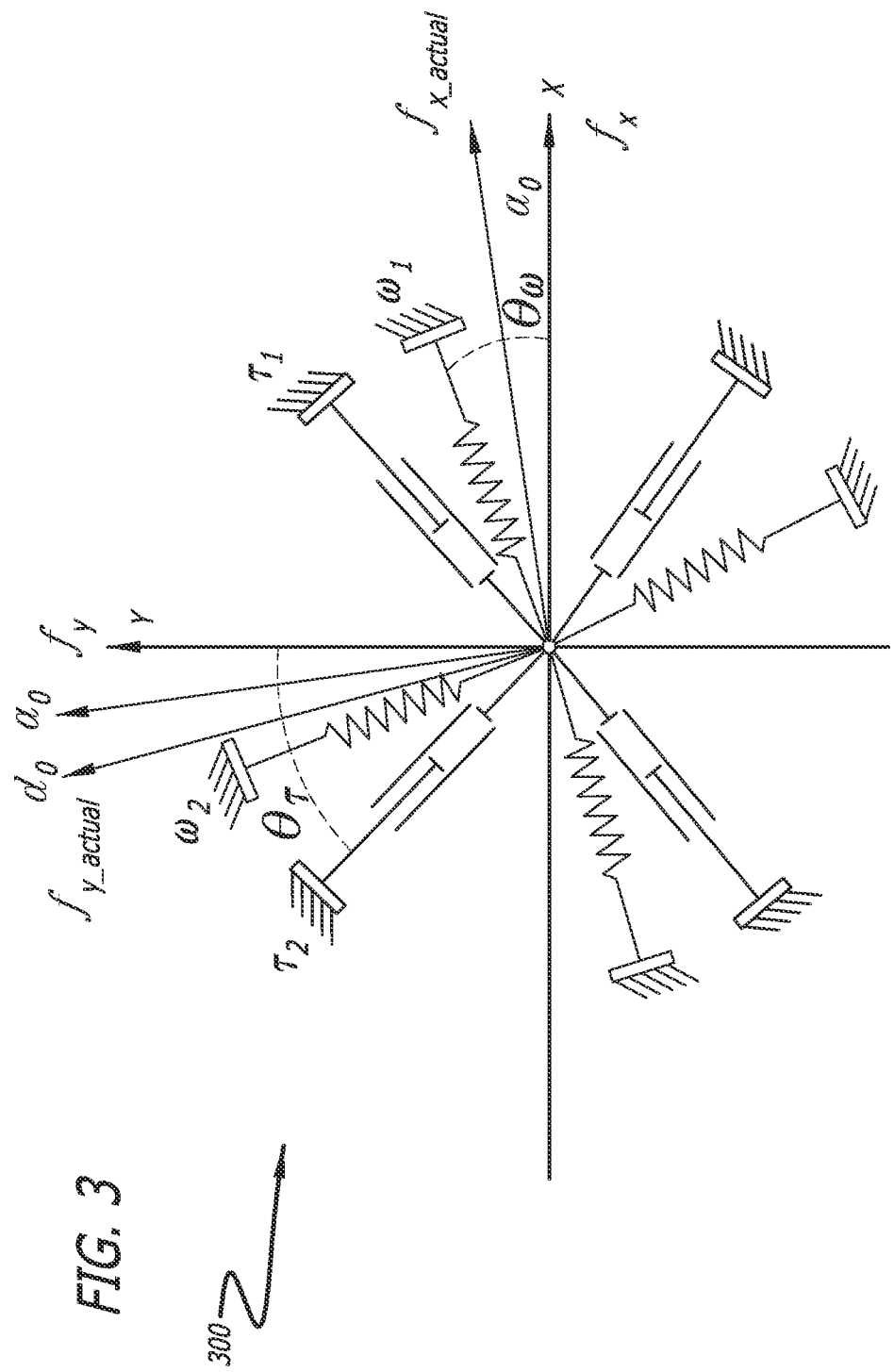
FIG. 3 is a graph depicting a simplified DRG model and axis definition.

FIG. 3 is a graph 300 depicting a simplified DRG model and axis definition. The gyroscopes's dynamics and error sources can be demonstrated with a simplified point-mass model. In particular, FIG. 3 shows a point mass vibrating with two (2) degrees of freedom. This is analogous to the two modes of vibration of the DRG.

In FIG. 3, the following are denoted:

x/y denotes the sensor fixed axis (where motion is sensed), $f_x/f_y$ denotes the actuation force along the sensor fixed axis, $f_{x\_actual}/f_{y\_actual}$ denotes the direction of the actual actuation force, $\theta_\omega$ denotes the orientation of the principle stiffness axis, with associated frequencies $\omega_1$ and $\omega_2$, and $\theta_\tau$ denotes the orientation of the principle damping axis, with associated damping time constraints $\tau_1$ and $\tau_2$.

The equations of motion that describe the coupling of the two in-plane modes are the following:

$$\begin{cases} \ddot{x} - k(2\Omega \dot{y} + \dot{\Omega}y) + \frac{2}{\tau}\dot{x} + \Delta\left(\frac{1}{\tau}\right)(\dot{y}\sin2\theta_\tau + \dot{x}\cos2\theta_\tau) + (\omega^2 - k'\Omega^2)x - \\ \quad \omega\Delta\omega(x\cos2\theta_\omega + y\sin2\theta_\omega) = f_x + \gamma_x g_x \\ \ddot{y} + k(2\Omega \dot{x} + \dot{\Omega}x) + \frac{2}{\tau}\dot{y} - \Delta\left(\frac{1}{\tau}\right)(\dot{y}\cos2\theta_\tau - \dot{x}\sin2\theta_\tau) + (\omega^2 - k'\Omega^2)y + \\ \quad \omega\Delta\omega(y\cos2\theta_\omega - x\sin2\theta_\omega) = f_y + \gamma_y g_y \end{cases} \quad (1)$$

where k is the angular gain, $$\Delta\left(\frac{1}{\tau}\right) = \frac{1}{\tau 1} - \frac{1}{\tau 2}, \text{ and } \frac{2}{\tau} = \left(\frac{1}{\tau 1} + \frac{1}{\tau 2}\right).$$

$\Omega$ is the sensor angular rate of rotation, $[f_x, f_y]$ represents the control forces along the direction of the sensor fixed axis x/y, and $\gamma_x g_x$ and $\gamma_y g_y$ represent the acceleration along x/y.

These two equations (1) are in the sensor fixed coordinate frame (x/y), which is defined in FIG. 3. Assume that the actual force directions are offset by an angle "$a_0$" from the x-axis, and "$a_0+d_0$" from the y-axis. In this case, the offset arises from the fact that the driving actuators are not colinear to the sensors due to small errors in manufacturing.

We then have:

$$\begin{cases} f_x = f_{x\_actual}\cos a_0 - f_{y\_actual}\sin(a_0 + d_0) \\ f_y = f_{x\_actual}\sin a_0 + f_{y\_actual}\cos(a_0 + d_0) \end{cases} \quad (2)$$

$$\begin{bmatrix} f_x \\ f_y \end{bmatrix} = \begin{bmatrix} \cos a_0 & -\sin(a_0 + d_0) \\ \sin a_0 & \cos(a_0 + d_0) \end{bmatrix} \begin{bmatrix} f_{x\_actual} \\ f_{y\_actual} \end{bmatrix}$$

$$\begin{bmatrix} f_{x\_actual} \\ f_{y\_actual} \end{bmatrix} = \underbrace{\frac{1}{\cos d}\begin{bmatrix} \cos(a_0 + d_0) & \sin(a_0 + d_0) \\ -\sin a_0 & \cos a_0 \end{bmatrix}}_{E}\begin{bmatrix} f_x \\ f_y \end{bmatrix}$$

Now, we will assume that we can rotate the drive actuator and the sensors simultaneously by an equal amount, $\varphi$. We have:

$$\begin{bmatrix} x \\ y \end{bmatrix} = \begin{bmatrix} \cos\varphi & -\sin\varphi \\ \sin\varphi & \cos\varphi \end{bmatrix}\begin{bmatrix} x_s \\ y_s \end{bmatrix} = M(\varphi)\begin{bmatrix} x_s \\ y_s \end{bmatrix} \quad (3)$$

$$\begin{bmatrix} f_x \\ f_y \end{bmatrix} = \begin{bmatrix} \cos\varphi & -\sin\varphi \\ \sin\varphi & \cos\varphi \end{bmatrix} \begin{bmatrix} x_s \\ y_s \end{bmatrix} = M(\varphi) \begin{bmatrix} f_{xs} \\ f_{ys} \end{bmatrix} = E^{-1} \begin{bmatrix} f_{x,actual} \\ f_{y,actual} \end{bmatrix}$$

$$EM(\varphi) \begin{bmatrix} f_{xs} \\ f_{ys} \end{bmatrix} = \begin{bmatrix} f_{x,actual} \\ f_{y,actual} \end{bmatrix} \quad (5)$$

By combining equations (1)-(3), we can now write the generalized equations of motion. We define the following terms:

$$\begin{bmatrix} \ddot{x} \\ \ddot{y} \end{bmatrix} + D \begin{bmatrix} \dot{x} \\ \dot{y} \end{bmatrix} + K \begin{bmatrix} x \\ y \end{bmatrix} = EM \begin{bmatrix} f_{xs} \\ f_{ys} \end{bmatrix} \quad (4)$$

$$\begin{bmatrix} \ddot{x} \\ \ddot{y} \end{bmatrix} = \frac{d^2 M(\varphi)}{dt^2} \begin{bmatrix} x_s \\ y_s \end{bmatrix} + 2 \frac{dM(\varphi)}{dt} \begin{bmatrix} \dot{x}_s \\ \dot{y}_s \end{bmatrix} + M(\varphi) \begin{bmatrix} \ddot{x}_s \\ \ddot{y}_s \end{bmatrix} \approx M(\varphi) \begin{bmatrix} \ddot{x}_s \\ \ddot{y}_s \end{bmatrix}$$

$$M \begin{bmatrix} \ddot{x}_s \\ \ddot{y}_s \end{bmatrix} + DM \begin{bmatrix} \dot{x}_s \\ \dot{y}_s \end{bmatrix} + KM \begin{bmatrix} x_s \\ y_s \end{bmatrix} = EM \begin{bmatrix} f_{xs} \\ f_{ys} \end{bmatrix}$$

By combining some terms and writing them into a matrix form, we can express this generalized equation in a compact form in the xs/ys frame as:

$$\begin{bmatrix} \ddot{x}_s \\ \ddot{y}_s \end{bmatrix} + M^{-1}DM \begin{bmatrix} \dot{x}_s \\ \dot{y}_s \end{bmatrix} + M^{-1}KM \begin{bmatrix} x_s \\ y_s \end{bmatrix} = M^{-1}EM \begin{bmatrix} f_{xs} \\ f_{ys} \end{bmatrix} \quad (5)$$

The control forces are selected to drive $x_s$ into a sinusoidal response; this is usually accomplished by a drive control loop, hereafter referred to as the automatic gain control (AGC) loop. Then, rotation at angular rate $\Omega$ about the sense axis transfers momentum from one degree of freedom (DOF) to the other DOF resulting in a change in amplitude and phase of y in a close-loop gyro sensor; the motion along y is nullified by a second control loop, hereafter referred to as the force to rebalance (FTR) loop. Assume the first control loop has established a constant amplitude response along $x_s$ so that:

$$\begin{cases} x_s = c_0 \cos(\omega_s t) \\ \dot{x}_s = -\omega_s c_0 \sin(\omega_s t) \end{cases} \quad (6)$$

Substitute equation (6) into (5), then the actuator force $f_{ys}$ along $y_s$ required for $y_s=0$ is:

$$f_{ys} = R\dot{x}_s + Qx_s = -R(\omega_s \cos_0)\sin(\omega_s t) + Qc_0 \cos(\omega_s t),$$
where $$\begin{cases} u_1 = \sin(a_0) \\ u_2 = \sin(a_0 + d_0) \\ u_3 = \sin(a_0 - 2\phi) \\ u_4 = \sin(a_0 + d_0 - 2\phi) \end{cases} \quad (7)$$

$$\begin{cases} v_1 = \sin(a_0 - 2\theta_\tau) \\ v_2 = \sin(a_0 + d_0 - 2\theta_\tau) \\ v_3 = \sin(a_0 - 2\theta_\tau + 2\phi) \\ v_4 = \sin(a_0 + d_0 - 2\theta_\tau + 2\phi) \end{cases},$$

$$\begin{cases} w_1 = \cos(a_0) \\ w_2 = \cos(a_0 + d_0) \\ w_3 = \cos(a_0 - 2\phi) \\ w_4 = \cos(a_0 + d_0 - 2\phi) \end{cases}$$

$$R(\phi) = -\frac{1}{2\tau \cos d_0} \Big( 2(u_1 + u_2 + u_3 - u_4) + \Delta\left(\frac{1}{\tau}\right)\tau(v_1 - v_2 + v_3 + v_4) - 2\Omega k \tau(w_1 + w_2 + w_3 - w_4) \Big)$$

$$Q(\phi) = \frac{\omega \Delta \omega}{\cos d_0}$$

$$\begin{cases} \sin(a_0 + d_0 - 2\theta_\omega) + \cos(2\theta_\omega - 2\phi)\sin(a_0 + d_0) - \\ \frac{1}{2}\sin(2\theta_\omega)\cos(a_0 + d_0) - \frac{1}{2}\sin(2\theta_\omega)\cos(a_0 + d_0)\cos(2\phi) + \\ \frac{1}{2}\cos(a_0 - 2\theta_\omega)\sin(2\phi) - \sin(2\theta_\omega)\cos(a_0) + \\ \frac{1}{2}\cos(a_0)\sin(2\phi - 2\theta_\omega) \end{cases}$$

In equation (7), the term R consists of a measurement term, $$\text{rate} = \frac{1}{\tau \cos d_0}(\Omega k \tau (w_1 + w_2 + w_3 - w_4)), \quad (8)$$

which is directly proportional to the input angular rate. It also consists of an error term, $$\text{bias} = -\frac{1}{2\tau \cos d_0}\Big(2(u_1 + u_2 + u_3 - u_4) + \Delta\left(\frac{1}{\tau}\right)\tau(v_1 - v_2 + v_3 + v_4)\Big), \quad (9)$$

which we refer to as the bias error, or simply the bias.

The term Q is referred to as quadrature, which stems from vibration motion "leaking" from the first mode to the second mode due to mass and stiffness imbalance.

In a real time gyro system, the raw FTR signal $f_{ys}$, is typically demodulated with respect to the derivative of the AGC signal, $\dot{x}_d = -\omega_s c_0 \sin(\omega_s t + \varphi)$. The demodulation is done in two stages. First we multiply $f_{ys}$ by $\dot{x}_d$ $$f_{ys,dm} = \quad (10)$$
$$R\dot{x}_s \dot{x}_d + Qx_s \dot{x}_d = R(\omega_s c_0)^2 \sin^2(\omega_s t) - Q\omega_s (c_0)^2 \sin(\omega_s t)\cos(\omega_s t) =$$
$$R(\omega_s c_0)^2 \left(\frac{1 - \cos(\omega_s t)}{2}\right) - Q\omega_s (c_0)^2 \frac{1}{2}\sin(2\omega_s t)$$

This signal is then passed through a low pass filter to strip out the high frequency content, which leaves:

$$\text{filter}[f_{ys,dm}] = \frac{R(\omega_s c_0)^2}{2} \tag{11}$$

DESCRIPTION OF THE PRESENT DISCLOSURE

For the system and method of the present disclosure, we will assume that the following conditions are met a priori: 1.) the gyro AGC loop has established a constant resonance amplitude, 2.) the FTR loop has been established so that equation (7) holds, and 3.) the demodulation and filtering in equations (10) and (11) have been performed correctly so that the output signal deals exclusively with equations (8) and (9).

For convenience, we will reiterate equation (8) and (9):

$$\text{rate} = \frac{1}{\tau \cos d_0}(\Omega k \tau (w_1 + w_2 + w_3 - w_4)), \tag{8}$$

$$\text{bias} = -\frac{1}{2\tau \cos d_0}\left(2(u_1 + u_2 + u_3 - u_4) + \Delta\left(\frac{1}{\tau}\right)\tau(v_1 - v_2 + v_3 + v_4)\right), \tag{9}$$

Where
$$\begin{cases} u_1 = \sin(a_0) \\ u_2 = \sin(a_0 + d_0) \\ u_3 = \sin(a_0 - 2\phi) \\ u_4 = \sin(a_0 + d_0 - 2\phi) \end{cases},$$

$$\begin{cases} v_1 = \sin(a_0 - 2\theta_\tau) \\ v_2 = \sin(a_0 + d_0 - 2\theta_\tau) \\ v_3 = \sin(a_0 - 2\theta_\tau + 2\phi) \\ v_4 = \sin(a_0 + d_0 - 2\theta_\tau + 2\phi) \end{cases},$$

$$\begin{cases} w_1 = \cos(a_0) \\ w_2 = \cos(a_0 + d_0) \\ w_3 = \cos(a_0 - 2\phi) \\ w_4 = \cos(a_0 + d_0 - 2\phi) \end{cases}$$

Referring to FIG. 3, $\theta_\tau$ is the angle between the resonator's principle damping axis and the sensing axis; $a_0$ is the misalignment angle between the drive angle and the sensing axis; $d_0$ is the non-orthongonality angle between the two drive directions; and lastly $\phi$ is an angle that we select to rotate the driving actuators and sensors simultaneously with respect to the resonator.

It should be noted that in one or more embodiments, a coriolis vibratory gyroscope is employed for the gyroscope of the disclosed system, method, and apparatus. However, it should be noted that in other embodiments, other types of gyroscopes may be employed including, but not limited to, various types of disk resonator gyroscopes and gyroscopes employing other means of vibration other than disks (e.g., vibrating plates).

Traditionally, the bias term given by equation (9), in a coriolis vibratory gyro (CVG), is dealt with by calibration. Basically, measurements are collected over long periods of time in order to obtain a statistically reliable estimate of the bias, and then the measurements are subtracted from the subsequent measurements. However, it should be noted that the system parameters $a_0$, $d_0$, and $\theta_\tau$ are functions of time, temperature, and structural dimensional stability. As such, a fixed calibration cannot track the changes in these parameters. Techniques have been developed recently to estimate the error terms by varying the drive/sense angle $\phi$.

Unfortunately for many CVG designs, the choice for $\phi$ is very limited by its physical construction. Most coriolis vibratory gyros (CVGs) with fixed electrodes and asymmetric resonator can only drive at a fixed angle. However, class III CVGs typically employ symmetric electrode and resonator designs and, as such, have more choices for $\phi$. But even for class III CVGs, the practical choices are typically limited to 0 and 90 only. Other angles require linearly combining forces from multiple sets of electrodes to achieve the desired drive angle, and linearly combining the sensed signals consistent with the drive angle. However, nonlinearities in the system (e.g., caused by electrostatic forces) and asymmetry due to manufacturing errors will alter the system parameters. In other words, $a_0$, $d_0$, and $\theta_\tau$ depend on $\phi$ for any angles other than 0 and 90. For those types of systems, the errors are not completely observable by varying $\phi$ alone.

The system and method of the present disclosure aim to eliminate $a_0$ and $d_0$ at the hardware level, thereby leaving the error involving only $\theta_\tau$, which can then be easily measured and estimated by using the available choices of $\phi$.

Figure 4:
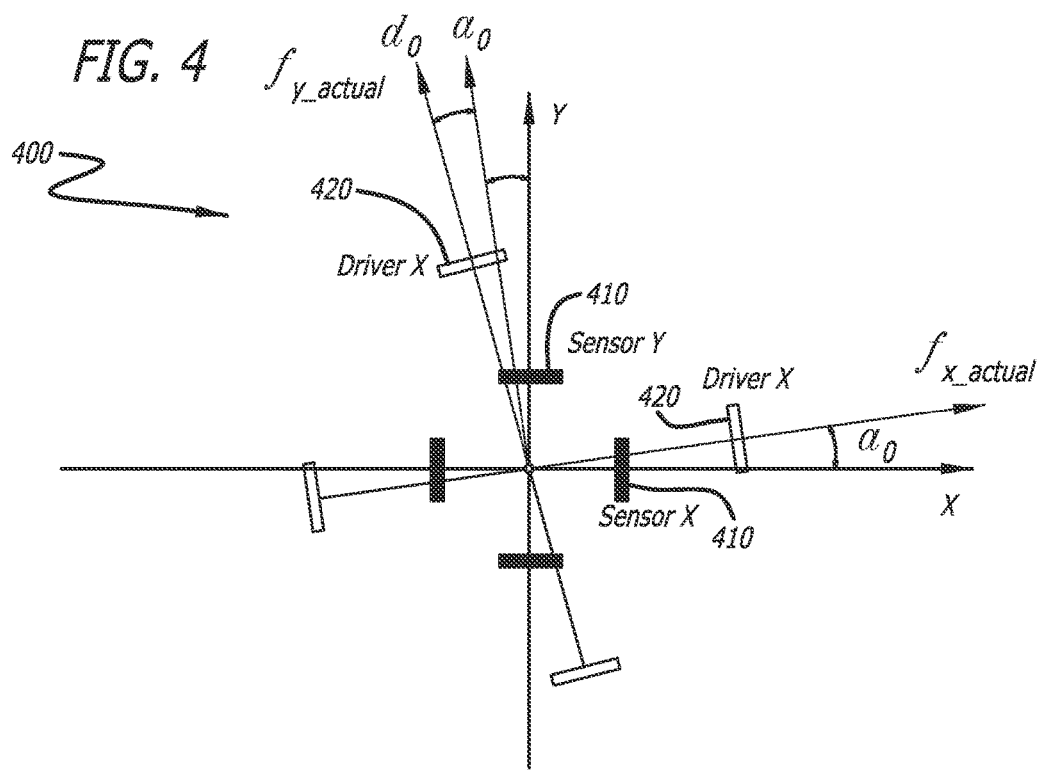
FIG. 4 is schematic diagram illustrating the drive-to-sense misalignment, $a_0$ and $d_0$, which is present in conventional disc resonator gyroscopes (DRGs).

FIG. 4 is schematic diagram 400 illustrating the drive-to-sense misalignment, $a_0$ and $d_0$, which is present in conventional disc resonator gyroscopes (DRGs). In conventional DRGs, both actuators (i.e. drivers) 420 and sensors 410 are sets of electrodes positioned next to the resonator's antinodes, either with the actuator 420 placed along the outside perimeter of the resonator and the sensor 410 placed along the inside perimeter of the resonator, or vise versa. The actuators 420 and the sensors 410 apply and sense electrostatic forces, respectively. The parameters $a_0$ and $d_0$ arise because the driving electrodes 420 are not perfectly aligned with the sense electrodes 410. FIG. 4 demonstrates this phenomenon using a simplified point-mass model. Such misalignment is caused by a number of factors, such as machining error, mechanical and thermal distortion, etc. Typically $a_0$ and $d_0$ are sensitive to temperature, mechanical stress, and electro-static voltage changes. As stated earlier, due to the lack of choices for the drive angle $\phi$, they cannot be distinguished from $\theta_\tau$, and therefore cannot be effectively estimated and compensated.

Figure 5:
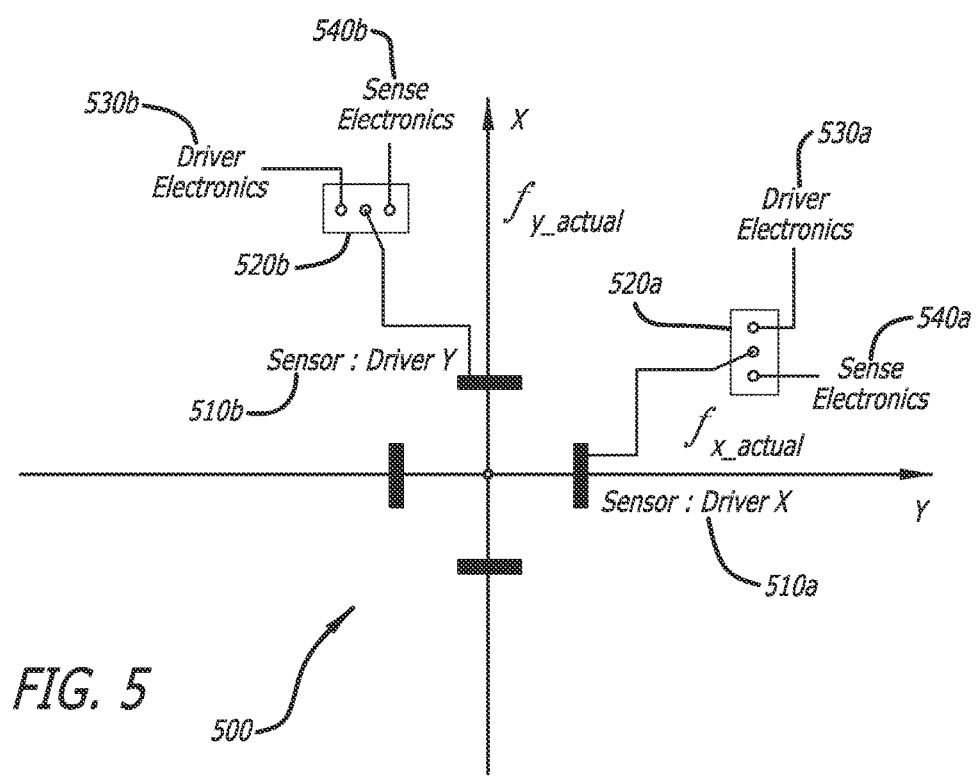
FIG. 5 is schematic diagram showing the architecture for the disclosed system for an electronic self calibration design for disk resonator gyroscopes using electrode time multiplexing, which multiplexes the driving/sensing features by using the same set of electrodes, in accordance with at least one embodiment of the present disclosure.

FIG. 5 is schematic diagram 500 showing the architecture for the disclosed system for an electronic self calibration design for disk resonating gyroscopes using electrode time multiplexing, which multiplexes the driving/sensing features by using the same set of electrodes 510a, 510b, in accordance with at least one embodiment of the present disclosure. For the disclosed system design, the driving electrodes, Driver$_x$ and Driver$_y$ 420 shown in FIG. 4, are eliminated. The sensor electrodes 510a, 510b (i.e. Sensor$_x$ and Sensor$_y$ 410 shown in FIG. 4) are used for both sensing and driving. This is achieved by a time multiplexing operating scheme. Referring to FIG. 5, Sensor/Driver x electrode 510a is used for the AGC loop, while Sensor/Driver y electrode 510b is used for the FTR loop. As before, the two loops are controlled independently from each other. Each set of electrodes 510a, 510b are connected to a switch (or relay) 520a, 520b, which toggles between the driver electronics 530a, 530b and the sense electronics 540a, 540b.

When the switch 520a, 520b is connected to the sense electronics 540a, 540b, the drive signal is disconnected from the electrodes 510a, 510b, thereby avoiding the drive signals from swamping the sense electronics 540a, 540b. During this interval, the sense electronics 540a, 540b measures the resonator motion and computes an estimated error from a desired target of motion. When the switch 520a, 520b is connected to the driver electronics 530a, 530b, its sensing capability is momentarily turned off. The driver electronics 530a, 530b applies an actuation signal to the electrodes 510a, 510b based on signals detected by the sensing electronics 540a, 540b from the previous interval. The disclosed design is illustrated in more detail in FIG. 6.

Figure 6:
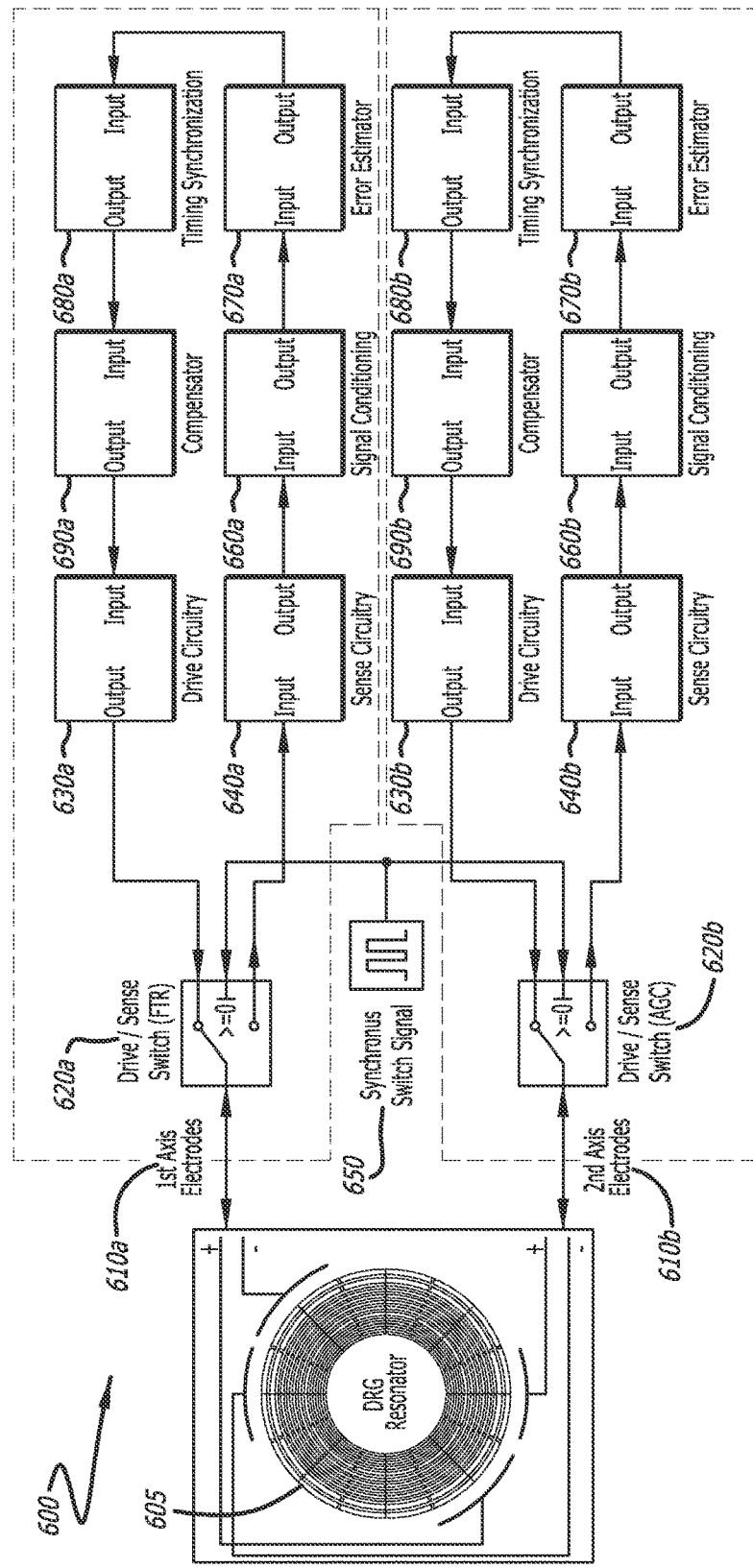
FIG. 6 is a block diagram showing the disclosed system for an electronic self calibration design for disk resonator gyroscopes using electrode time multiplexing, which multiplexes the driving/sensing features by using the same set of electrodes, in accordance with at least one embodiment of the present disclosure.

FIG. 6 is a block diagram 600 showing the disclosed system for an electronic self calibration design for disk resonating gyroscopes using electrode time multiplexing, which multiplexes the driving/sensing features by using the same set of electrodes 610a, 610b, in accordance with at least one embodiment of the present disclosure. The direction of the arrows in FIG. 6 indicates the direction of the signal flow. The upper right group of blocks represents units, associated with a first axis (e.g., the x-axis) of the resonator, that are operating in the FTR control loop. And, the lower right group of blocks represents units, associated with a second axis (e.g., the y-axis) of the resonator, that are operating in the AGC loop. It should be noted that during operation, the upper right group of units and the lower right group of units will switch between operating in the FTR control loop and operating in the AGC control loop.

Electrodes 610a, 610b are connected to a respective switch or relay (e.g., drive/sense switch) 620a, 620b, which toggles between the driver electronics (e.g., drive circuitry) 630a, 630b and the sense electronics (e.g., sense circuitry) 640a, 640b. When the switch 620a, 620b is connected to the sense electronics 640a, 640b, the drive signal is disconnected from the electrodes 610a, 610b, thereby avoiding the drive signals from swamping the sense electronics 640a, 640b. During this interval, the sense electronics 640a, 640b measures the resonator motion and computes an estimated error from a desired target of motion for the resonator. When the switch 620a, 620b is connected to the driver electronics 630a, 630b, its sensing capability is momentarily turned off. The driver electronics 630a, 630b applies an actuation signal to the electrodes 610a, 610b based on signals detected by the sensing electronics 640a, 640b from the previous interval.

Switches 620a, 620b of both loops will toggle between drive and sense at the same time. The switches 620a, 620b are synchronized by a master switch signal produced by a synchronous switch 650.

The signal conditioning block 660a, 660b in both groups typically consists of multiple filters based on the resonator frequency characteristics. The error estimator block 670a, 670b in both groups estimates the amplitude error and/or deviation from the desired value (or target motion) based on the measurement update when in sense mode, and propagates the error estimate when not in the sense mode. An example of such filter is a Kalman Filter; however, other types of filters may be employed by the design. The timing synchronization block 680a, 680b in both groups can either be implemented by an all pass filter or a low pass filter with appropriate phase adjustment to account for the lag. The compensator 690a, 690b then determines the appropriate gain when in drive mode, and outputs zero when not in drive mode It should be noted that this design implementation relies on the fact that the resonator has a high quality factor, and that the switching time is much smaller than the resonator's ring down time.

This design implementation eliminates the error sources due to electrode misalignment, so that $a_0$ and $d_0$ in equations (8) and (9) are zero. (8) and (9) then reduce to:

$$\text{rate} = 2\Omega k \quad (8b)$$

$$\text{bias} = \Delta\left(\frac{1}{\tau}\right)\sin(2\theta_\tau - 2\phi) \quad (9b)$$

$\phi$ is the drive angle that we can choose by applying drive voltages to the appropriate set of electrodes. Referring to FIG. 4, when we apply the AGC loop to the x-axis, and apply the FTR loop to the y-axis, then the drive angle $\phi$ is 0. Alternatively, if we apply the AGC loop to the y-axis, and apply the FTR loop to the x-axis, then $\phi$ is 90. It immediately follows that:

$$\text{bias}_{(\phi=0)} = \Delta\left(\frac{1}{\tau}\right)\sin(2\theta_\tau) \text{ and}$$

$$\text{bias}_{(\phi=90)} = -\Delta\left(\frac{1}{\tau}\right)\sin(2\theta_\tau)$$

The bias error is equal in magnitude and opposite in sign for these two drive angles. We can take advantage of this to allow us to calibrate out for the bias error. Assume that for a first configuration (i.e. configuration 1), we apply the AGC loop to the x-axis, and apply the FTR loop to the y-axis; and for a second configuration (i.e. configuration 2), we apply the AGC loop to the y-axis, and apply the FTR loop to the x-axis. If we toggle between the two configurations while holding the input rate $\Omega$ constant, then the two outputs we get are:

$$\text{Output1} = 2\Omega k + \Delta\left(\frac{1}{\tau}\right)\sin(2\theta_\tau)$$

$$\text{Output2} = 2\Omega k - \Delta\left(\frac{1}{\tau}\right)\sin(2\theta_\tau)$$

Note the sum of these two outputs gives us a pure measurement on the rate $\Omega$ without any errors, while the difference of the two outputs gives us a direct measurement on the bias.

We can operate the gyro such that it toggles continuously between configuration 1 and 2 to continuously track $\Omega$ and the bias. Such a design has the advantages of being able to eliminate all bias errors over any temperature and operating environment. The drawback is the reduced output data rate and gyro bandwidth. An alternative approach is to apply the toggling only when calibrating the gyro, but operate the gyro using only one of the two configurations. Once a bias error is measured with a high degree of confidence, we can use the fixed value and subtract it from measurements made during operation. This approach has no adverse effect on the gyro bandwidth or the output data rate, but error will accumulate when the bias error changes over temperature or other environmental effects.

FIG. 7 is a flow chart depicting the disclosed method 700 for an electronic self calibration design for disk resonating gyroscopes using electrode time multiplexing, which multiplexes the driving/sensing features by using the same set of electrodes, in accordance with at least one embodiment of the present disclosure. At the start 710 of the method 700 at least one first axis sensor/driver electrode, associated with a first axis of a resonator of the gyro, senses motion associated with the resonator 720. Then, at least one first axis sensor/driver electrode, associated with the first axis of the resonator, is driven with a first axis actuation signal produced by first axis drive circuitry, associated with the first axis of the resonator 730.

Also, at least one second axis sensor/driver electrode, associated with a second axis of the resonator, senses motion associated with the resonator 740. Then, at least one second axis sensor/driver electrode, associated with the second axis of the resonator, is driven with a second axis actuation signal produced by second axis drive circuitry, associated with the second axis of the resonator 750. Then, the method 700 ends 760.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for determining motion with a disk resonator gyroscope, the method comprising:
   sensing, by at least one first axis electrode for sensing and driving associated with a first axis of a resonator, motion associated with the resonator;
   driving the at least one first axis electrode for sensing and driving with a first axis actuation signal produced by first axis drive circuitry associated with the first axis of the resonator, wherein the sensing and the driving of the at least one first axis electrode for sensing and driving are time multiplexed;
   sensing, by at least one second axis electrode for sensing and driving associated with a second axis of the resonator, the motion associated with the resonator;
   driving the at least one second axis electrode for sensing and driving with a second axis actuation signal produced by second axis drive circuitry associated with the second axis of the resonator, wherein the sensing and the driving of the at least one second axis electrode for sensing and driving are time multiplexed;
   synchronizing, with a synchronous switch, the time multiplexing of the sensing and the driving of the at least one first axis electrode for sensing and driving with the time multiplexing of the sensing and the driving of the at least one second axis electrode for sensing and driving; and
   switching, with the synchronous switch, a mode of operation for the first axis drive circuitry and a mode of operation for the second axis drive circuitry such that the first axis drive circuitry and the second axis drive circuitry operate in different modes of operation, and wherein the modes of operation are a force to rebalance (FTR) mode and an automatic gain control (AGC) mode.

2. The method of claim 1, wherein the sensing by the at least one first axis electrode for sensing and driving, and the driving of the at least one first axis electrode for sensing and driving are time multiplexed by use of a first axis switch associated with the first axis of the resonator.

3. The method of claim 1, wherein the sensing by the at least one second axis electrode for sensing and driving, and the driving of the at least one second axis electrode for sensing and driving are time multiplexed by use of a second axis switch associated with the second axis of the resonator.

4. The method of claim 1, wherein the method further comprises determining a total output signal by summing the first axis actuation signal produced when the first axis drive circuitry is operating in the force to rebalance (FTR) mode, with the second axis actuation signal produced when the second axis drive circuitry is operating in the FTR mode,
   wherein the total output signal is proportional to the motion of the resonator without bias error.

5. The method of claim 1, wherein the first axis is an x-axis of the resonator and the second axis is a y-axis of the resonator.

6. The method of claim 1, wherein the first axis is a y-axis of the resonator and the second axis is an x-axis of the resonator.

7. The method of claim 1, wherein the method further comprises performing, by at least one of at least one unit associated with the first axis of the resonator or at least one unit associated with the second axis of the resonator, a closed-loop operation to provide at least one of signal conditioning, error estimation, or compensation.

8. The method of claim 1, wherein at least one of a signal conditioning unit, a compensator, a timing synchronization unit, or an error estimator is associated with the first axis of the resonator.

9. The method of claim 1, wherein at least one of a signal conditioning unit, a compensator, a timing synchronization unit, or an error estimator is associated with the second axis of the resonator.

10. The method of claim 1, wherein the resonator comprises a plurality of resonator rings.

11. A system for a disk resonator gyroscope, the system comprising:
    at least one first axis electrode for sensing and driving associated with a first axis of a resonator to sense motion associated with the resonator;
    a first axis drive circuitry associated with the first axis of the resonator to produce a first axis actuation signal to drive the at least one first axis electrode for sensing and driving, wherein the sensing and the driving of the at least one first axis electrode for sensing and driving are time multiplexed;
    at least one second axis electrode for sensing and driving associated with a second axis of the resonator to sense the motion associated with the resonator;
    a second axis drive circuitry associated with the second axis of the resonator to produce a second axis actuation signal to drive the at least one second axis electrode for sensing and driving, wherein the sensing and the driving of the at least one second axis electrode for sensing and driving are time multiplexed; and a synchronization switch to synchronize the time multiplexing of the sensing and the driving of the at least one first axis electrode for sensing and driving with the time multiplexing of the sensing and the driving of the at least one second axis electrode for sensing and driving, and to switch a mode of operation for the first axis drive circuitry and a mode of operation for the second axis drive circuitry such that the first axis drive circuitry and the second axis drive circuitry operate in different modes of operation, and wherein the modes of operation are a force to rebalance (FTR) mode and an automatic gain control (AGC) mode.

12. The system of claim 11, wherein the system further comprises a first axis switch associated with the first axis of the resonator for the time multiplexing of the sensing by the at least one first axis electrode for sensing and driving and the driving of the at least one first axis electrode for sensing and driving.

13. The system of claim 11, wherein the system further comprises a second axis switch associated with the second axis of the resonator for the time multiplexing of the sensing by the at least one second axis electrode for sensing and driving and the driving of the at least one second axis electrode for sensing and driving.

14. The system of claim 11, wherein the system further comprises at least one processor to determine a total output signal by summing the first axis actuation signal produced when the first axis drive circuitry is operating in the force to rebalance (FTR) mode, with the second axis actuation signal produced when the second axis drive circuitry is operating in the FTR mode, wherein the total output signal is proportional to the motion of the resonator without bias error.

15. The system of claim 11, wherein the first axis is an x-axis of the resonator and the second axis is a y-axis of the resonator.

16. The system of claim 11, wherein the first axis is a y-axis of the resonator and the second axis is an x-axis of the resonator.

17. The system of claim 11, wherein a closed-loop operation is performed by at least one of at least one unit associated with the first axis of the resonator or at least one unit associated with the second axis of the resonator to provide at least one of signal conditioning, error estimation, or compensation.

18. The system of claim 11, wherein at least one of a signal conditioning unit, a compensator, a timing synchronization unit, or an error estimator is associated with the first axis of the resonator.

19. The system of claim 11, wherein at least one of a signal conditioning unit, a compensator, a timing synchronization unit, or an error estimator is associated with the second axis of the resonator.

20. The system of claim 11, wherein the resonator comprises a plurality of resonator rings.

* * * * *